United States Patent
Wayman et al.

(10) Patent No.: US 9,812,022 B2
(45) Date of Patent: Nov. 7, 2017

(54) METHOD AND APPARATUS FOR PROVIDING HEALTHIER FOOD PURCHASE SUGGESTIONS TO A SHOPPER

(71) Applicant: Xerox Corporation, Norwalk, CT (US)

(72) Inventors: Elizabeth Dubiel Wayman, Ontario, NY (US); Karen M. Braun, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 424 days.

(21) Appl. No.: 14/159,205

(22) Filed: Jan. 20, 2014

(65) Prior Publication Data

US 2015/0206450 A1    Jul. 23, 2015

(51) Int. Cl.
   *G06Q 30/00* (2012.01)
   *G09B 5/02* (2006.01)
   *G06Q 30/06* (2012.01)

(52) U.S. Cl.
   CPC ........... *G09B 5/02* (2013.01); *G06Q 30/0631* (2013.01); *G06Q 30/0639* (2013.01)

(58) Field of Classification Search
   CPC .......................................... G06Q 30/06–30/08
   USPC .............................................. 705/26.1–27.2
   See application file for complete search history.

(56) References Cited

U.S. PATENT DOCUMENTS

| | | | | |
|---|---|---|---|---|
| 2009/0055199 | A1* | 2/2009 | Yusuf | G06Q 50/12 705/15 |
| 2013/0262478 | A1* | 10/2013 | Kemp | G06Q 30/02 707/748 |
| 2014/0067564 | A1* | 3/2014 | Yuan | G06Q 30/0633 705/16 |
| 2014/0214446 | A1* | 7/2014 | Nusbaum | G09B 19/00 705/2 |
| 2014/0214590 | A1* | 7/2014 | Argue | G06Q 30/0631 705/26.7 |

\* cited by examiner

*Primary Examiner* — Ethan D Civan
*Assistant Examiner* — Ming Shui

(57) ABSTRACT

A method, non-transitory computer readable medium, and apparatus for providing a healthier food purchase suggestion to a shopper are disclosed. For example, the method receives a selection of a food item that the shopper has selected to purchase, determines one or more healthier food items that have a higher score than a score of the food item that the shopper has selected, selects one of the one or more healthier food items based upon a profile of the shopper, provides the one of the one or more healthier food items that is selected as the healthier food purchase suggestion to the shopper.

6 Claims, 3 Drawing Sheets

METHOD AND APPARATUS FOR PROVIDING HEALTHIER FOOD PURCHASE SUGGESTIONS TO A SHOPPER

The present disclosure relates generally to analysis of shopping habits of an individual and, more particularly, to a method and an apparatus for providing healthier food purchase suggestions to a shopper.

BACKGROUND

Obesity is an epidemic problem in the United States. Some of the reasons for the problem of obesity include a lack of knowledge about the proper foods to eat and the health content of foods people buy at the grocery store. For example, some people may buy food items because they believe the food item is "healthy" when in reality it is an unhealthy food item. People also fall into a pattern of behavior or habit of eating the same unhealthy foods.

There is also a growing trend that consumers want to make healthier choices, but do not know how to make those healthier choices. For example, consumers may not know what ingredients are healthy or what nutritional information or what amounts of the nutritional information on a food label is considered to be healthy.

In addition, a grocery store is generally set up with the unhealthiest foods in the most convenient aisles. For example, prime shelf space is paid for by food manufacturers that may not have healthy choices. In addition, most of the unhealthy food items may be arranged in the middle aisles of the store that have more foot traffic than the aisles around the perimeter of the store.

SUMMARY

According to aspects illustrated herein, there are provided a method, a non-transitory computer readable medium, and an apparatus for providing a healthier food purchase suggestion to a shopper. One disclosed feature of the embodiments is a method that receives a selection of a food item that the shopper has selected to purchase, determines one or more healthier food items that have a higher score than a score of the food item that the shopper has selected, selects one of the one or more healthier food items based upon a profile of the shopper, provides the one of the one or more healthier food items that is selected as the healthier food purchase suggestion to the shopper.

Another disclosed feature of the embodiments is a non-transitory computer-readable medium having stored thereon a plurality of instructions, the plurality of instructions including instructions which, when executed by a processor, cause the processor to perform an operation that receives a selection of a food item that the shopper has selected to purchase, determines one or more healthier food items that have a higher score than a score of the food item that the shopper has selected, selects one of the one or more healthier food items based upon a profile of the shopper, provides the one of the one or more healthier food items that is selected as the healthier food purchase suggestion to the shopper.

Another disclosed feature of the embodiments is an apparatus comprising a processor and a computer readable medium storing a plurality of instructions which, when executed by the processor, cause the processor to perform an operation that receives a selection of a food item that the shopper has selected to purchase, determines one or more healthier food items that have a higher score than a score of the food item that the shopper has selected, selects one of the one or more healthier food items based upon a profile of the shopper, provides the one of the one or more healthier food items that is selected as the healthier food purchase suggestion to the shopper.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and non-transitory computer-readable medium for providing healthier food purchase suggestions to a shopper. As discussed above, obesity is an epidemic problem in the United States. Some of the reasons for the problem of obesity include a lack of knowledge about the proper foods to eat and the health content of foods people buy at the grocery store, bad habits and the way grocery stores are arranged.

One embodiment of the present disclosure makes it easier for individuals to make healthier food choices when grocery shopping. For example, foods available in a grocery store may be provided with a score using any simple scoring system based upon nutritional information of each food. The score may be a single numerical value or a vector containing various attributes. These attributes may comprehend aspects such as allergens, dietary restrictions, food groups, etc. Each individual may have a shopping history (e.g., using purchases tracked on a grocery's stores loyalty club) analyzed. Based upon the shopping history, individual preferences/allergies and the scoring system, the user may be provided healthier suggestions for various food items that the individual is about to buy.

Figure 1:
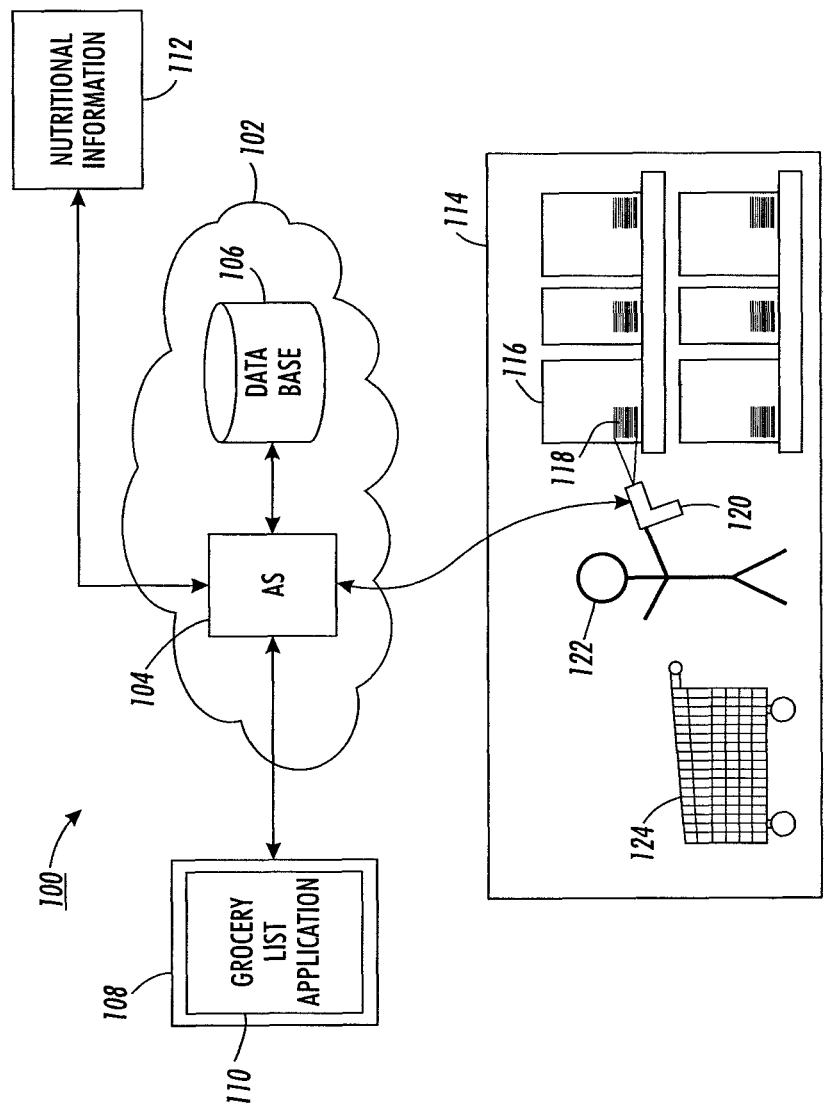
FIG. 1 illustrates an example block diagram of a communication network of the present disclosure.

FIG. 1 illustrates an example communications network 100 of the present disclosure. In one embodiment, the communications network 100 may include an Internet Protocol (IP) network 102. The IP network 102 may include an application server (AS) 104 and a database (DB) 106. The IP network 102 may include other network elements, such as for example, border elements, firewalls, routers, switches, and the like that are not shown for simplicity. In one embodiment, the IP network 102 may be operated by a grocery store 114 or by a communication network service provider that the grocery store 114 subscribes to for communication services.

In one embodiment, the AS 104 may perform various functions disclosed herein and be deployed as a server or a general purpose computer described below in FIG. 3. In one embodiment, the DB 106 may store various types of information. For example, the DB 106 may store shopping histories of shoppers who are loyalty club members of the grocery store, food items in inventory, nutritional information associated with the food items, a score associated with each food item based upon the nutritional information, a profile of each shopper (e.g., a diet plan defined by the shopper, a preference of one or more brands, any food allergies, etc.), a social network of shoppers and shopping preferences for each shopper in the social network, and the like.

In one embodiment, the AS 104 may search the Internet for nutritional information about each food item that the grocery store 114 has on inventory or sells. In one embodiment, the nutritional information may be available on a public website, such as for example, a government health data website. The nutritional information may be used to calculate a score for each food item.

For example, the score may be based on a scale of 1-100 where a higher score is considered to be "healthier". The score may be based on the nutritional information, such as for example, calories, fat content, sugar content, protein content, vitamin content, artificial flavoring or artificial ingredients, and the like. One example scoring system that may be used may be the Nuval® scoring system.

In one embodiment, as noted above, the score may be a single numerical value or a vector containing various attributes. The attributes may comprehend aspects such as allergens, dietary restrictions, food groups, and the like. For example, a food item may have a vector of scores for each category. To illustrate, a vector score may be comprised of an overall score, a score for a number of allergens contained in the food item, a score for a likelihood of being part of dietary restrictions and a score for the food group that the food item is a part of. Using the example vector score, a food item may have a vector score represented as (95, 90, 80, 92) corresponding to each component of the vector.

In one embodiment, a shopper 122 may generate a selection of food items that the shopper 122 is interested in purchasing. In one embodiment, the selection may be made via an endpoint device 108 using an application 110 running on the endpoint device 108. In one embodiment, the endpoint device 108 may be any type of endpoint device including, for example, a smart phone, a laptop computer, a desktop computer, a tablet computer, a netbook, and the like. In one embodiment, the application 110 may be a mobile application or a website hosted by the AS 104.

In one embodiment, the shopper 122 may generate a shopping list of food items that the shopper 122 is going to purchase in a future trip to the grocery store 114 via the application 110 on the endpoint device 108. In other words, one embodiment of the disclosure may be performed before the shopper goes to the grocery store 114. The list of food items selected by the shopper 122 may be transmitted to the AS 104.

The AS 104 may analyze each food item selected by the shopper and determine if a healthier food item that can be a substitute for the food item selected by the shopper 122 is available. In one embodiment, the healthier food item may be defined as any food item that has a higher score than the food item originally selected by the shopper 122.

In one embodiment, a "substitute" may be defined as a food item that may provide a similar taste and a similar function as the food item originally selected by the shopper 122. In one embodiment, a "substitute" may be defined as a food item that is in the same food group as the food item originally selected by the shopper 122. For example, the food group may be general such as meat, grain, oils, snacks, bread, vegetables, dairy, and the like. In another embodiment, the food group may be more specific, such as red meat, poultry, potato chips, cereals, canned soups, nuts, milk, and the like. In one embodiment, a "substitute" may be defined as a food item that is within a same area or level of a food network chart. In other words, the present disclosure is not attempting to make major dietary changes for the shopper 122 (e.g., changing the shopper's diet by adding a new food item not considered or selected by the shopper 114 or removing an unhealthy food item without suggesting a replacement). Rather, the present disclosure is attempting to "nudge" the shopper 122 to make healthier substitutions of various food items the shopper 122 is selecting to buy.

It should be noted that the present disclosure relates to food items (e.g., edible items) only. In other words, the present disclosure is not attempting to include all shopping items or suggestions for shoppers of any shopping item, such as for example, clothing, appliances, toys, and the like.

For example, if peanut oil having a score of 34 is selected by the shopper 122, the AS 104 may recognize that grapeseed oil having a score of 52 or vegetable oil having a score of 40 may be a "healthier" substitute than peanut oil. For example, grapeseed oil and vegetable oil are both oils that have similar tastes and consistency as the peanut oil. In another example, if the shopper 122 has selected peanut butter having a health score of 20, the AS 104 may recognize that almond butter having a score of 45 may be a "healthier" substitute than butter. In another example, the shopper 122 may select regular potato chips having a score of 35. The AS 104 may recognize that baked chips having a score of 50 or pretzels having a score of 46 may be a "healthier" substitute than regular potato chips. Other examples may be evident and the examples provided above are not intended to be limiting.

In one embodiment, the AS 104 may compare the healthier substitute food items and determine whether one of the healthier substitute food items is an acceptable substitute based upon a profile of the shopper 122. In one embodiment, the profile may include a shopping history of the shopper, a similar purchase by another shopper in a social network of the shopper 122, one or more food allergies or a dieting goal defined by the shopper 122. In one embodiment, the profile may include any or all of the above.

In one embodiment, the shopping history of the shopper may include a stored list of each item that was purchased on each trip to the grocery store 114 by the shopper 122. For example, the shopper 122 may be a member of a loyalty club program of the grocery store 114. Thus, each time the shopper 122 checks out of the grocery store 114, the loyalty club member number may be entered or scanned to associate and store the purchased food items in the DB 106. The shopping history can be analyzed by the AS 104 to determine which brands the shopper 122 prefers what items the shopper 122 has purchased or tried in the past, and the like.

For example, if organic peanut butter is a healthier option than a lead brand peanut butter and the shopper 122 has purchased organic products before, the organic peanut butter may fit the profile 114 of the shopper 122. As a result, the organic peanut butter may be provided as a healthier food purchase suggestion to the shopper 122. In another example, the AS 104 may determine that the shopper 122 prefers Annie's® brand food items. Thus, if a healthier food item is found that is an Annie's® brand, the AS 104 may provide the Annie's® brand food item to the shopper 122 as a healthier food purchase suggestion.

In one embodiment, the shopper 122 may join a social network of other shoppers that are members of the loyalty club program of the grocery store 114. As a result, the AS 104 may see what other food items the friends of the shopper 122 are buying. If any of the food items are healthier than the food items selected by the shopper 122, the AS 104 may assume that the shopper 122 may also like the other food items purchase by friends due to the assumption that the shopper 122 enjoys similar tastes or brands as his or her friends.

In one embodiment, the shopper 122 may list food allergies or certain brands that he or she does not like or wants to avoid. The shopper 122 may also include in his or her profile a diet plan. For example, if the shopper 122 is trying to lose 10 pounds in one month, the AS 104 may provide more aggressive substitute food items for the healthier food purchase suggestions.

Thus, based upon the user profile if any one of the healthier substitute food items is acceptable based upon a profile of the shopper 122 the healthier substitute food items may be provided as healthier food purchase suggestions before the shopper 122 goes to the grocery store 114. The suggestions may be provided to the shopper 122 on the application 110 via the end point device 108.

In one embodiment, the application 110 on the endpoint device 108 may automatically replace the original food items selected by the shopper 122 with the healthier food purchase suggestions that are accepted by the shopper 122, and then notify the shopper that the replacement was made. As a result, the grocery list of the shopper 122 may be automatically updated and provided to the shopper 122 before the shopper goes to the grocery store 114.

In another embodiment, the shopper 122 may generate a selection of food items in real-time as the shopper 122 scans items into a shopping cart 124. In other words, the healthier food purchase suggestions may be made to the shopper 122 as the shopper 122 is shopping in the grocery store 114.

For example, a mobile scanner 120 having a user interface (e.g., text only or graphical) may be used by the shopper 122 to scan a universal product code (UPC) 118 on a food item 116 on the shelves of the grocery store 114. As the shopper 122 scans the food item 116, the mobile scanner 120 may either locally or via remote communication (e.g., via a wireless communication over a Wi-Fi or a cellular network) with the AS 104 determine a score of the scanned food item 116. The mobile scanner 120 may then determine if a healthier substitute food item having a higher score than the score of the scanned food item 116 is available either locally or via remote communication with the AS 104.

If a healthier substitute food item is available, the mobile scanner 120 may display via the interface the healthier food purchase suggestion. The mobile scanner 120 may also provide information to where the healthier substitute food item is located and a cost for comparison so the shopper 122 can decide based on price. The process may be repeated for each food item 116 that is scanned.

In one embodiment, the scoring may be performed by the AS 104 or the mobile scanner 120 as described in the above examples. The determination of an available healthier substitute food item may be based upon a profile of the shopper as described above.

In one embodiment, the healthier food purchase suggestions may be provided to the shopper 122 after the shopper 122 has completed his or her check-out or purchase of food items. For example, based upon the food items that were purchased, a receipt may be printed by a register or computer associated with a register with the healthier food purchase suggestions.

In one embodiment, the scoring may be performed by the AS 104 or the computer/register in communication with the AS 104 (e.g., via a wireless communication over a Wi-Fi or a cellular network) as described in the above examples. The determination of an available healthier substitute food item may be based upon a profile of the shopper as described above.

Figure 2:
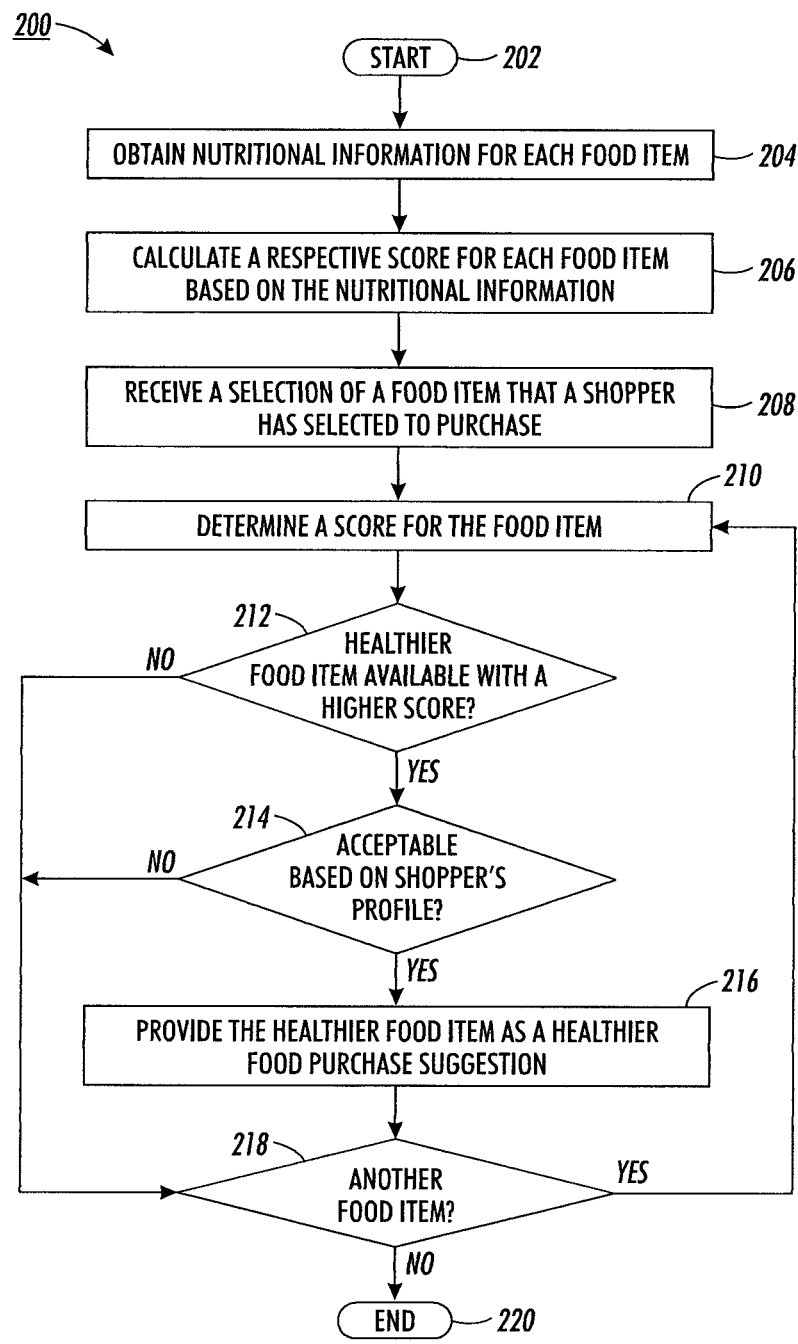
FIG. 2 illustrates an example flowchart of a method for providing a healthier food purchase suggestion to a shopper.

FIG. 2 illustrates a flowchart of a method 200 for providing a healthier food purchase suggestion to a shopper. In one embodiment, one or more steps or operations of the method 200 may be performed by the AS 104 or a general-purpose computer as illustrated in FIG. 3 and discussed below.

At step 202 the method 200 begins. At step 204, the method 200 obtains nutritional information for each food item that is kept in inventory by a grocery store or sold by the grocery store. In one embodiment, the nutritional information may be obtained from information available on a public website, such as for example, government health data or nutritional data websites.

At step 206, the method 200 calculates a respective score for each food item based on the nutritional information. In one embodiment, the nutritional data may be used to calculate a score for each food item. For example, the score may be based on a scale of 1-100 where a higher score is considered to be "healthier". The score may be based on the nutritional information, such as for example, calories, fat content, sugar content, protein content, vitamin content, artificial flavoring or artificial ingredients, and the like. One example scoring system that may be used may be the Nuval® scoring system.

At step 208, the method 200 receives a selection of a food item that a shopper has selected to purchase. In one embodiment, the selection may be received from an endpoint device is running a grocery list application. For example, the shopper may input one or more food item selections in the endpoint device and the endpoint device may then transmit the food item selections to an application server performing the method 200. In another embodiment, the selection may be received from a mobile scanner being used by a shopper in the grocery store as the shopper is scanning UPC labels of the food items the shopper selects. In another embodiment, the selection may be received from a cash register/computer that is scanning the food items being purchased by the shopper as the shopper is checking out.

At step 210, the method 200 determines a score for the food item that the shopper has selected. In one embodiment, the method 200 may analyze one food item at a time. For example, a food item originally selected by the shopper may be looked up in the database to obtain a score of the food item.

At step 212, the method 200 determines if a healthier food item with a higher score than the score of the food item selected by the shopper is available. In one embodiment, the healthier food item is a substitute for the food item originally selected by the shopper. In one embodiment, more than one healthier food item may be determined to be available as a substitute healthier food item. If no healthier food time is available, the method 200 proceeds to step 218.

However, if a healthier food item is available at step 212, the method 200 may proceed to step 214. At step 214, the method 200 determines if the healthier food item is acceptable based on a profile of the shopper. As discussed, above the profile may include a shopping history of the shopper, a similar purchase by another shopper in a social network of the shopper, one or more food allergies or a dieting goal defined by the shopper. If none of the healthier food items that are available are acceptable based on the profile of the shopper, the method 200 may proceed to step 218.

However, if one or more of the healthier food items are acceptable based upon a profile of the shopper at step 214, the method 200 may proceed to step 216. At step 216, the method 200 may provide the healthier food item as a healthier food purchase suggestion. In one embodiment, the suggestion may be provided on an endpoint device used by the shopper or a receipt received by the shopper (e.g., a computer if the shopper is creating a shopping list at home before going to the grocery store, on a mobile scanner at the grocery store as the shopper is scanning items to purchase, on a receipt received by the shopper after checking out of the grocery store, and the like).

At step 218, the method 200 determines if another food item needs to be analyzed. If another food item that was selected by the shopper needs to be analyzed, the method 200 may return to step 210 and repeat steps 210-218. However, if no additional food items need to be analyzed at step 218, the method 200 may proceed to step 220. At step 220, the method 200 ends.

It should be noted that although not explicitly specified, one or more steps, functions, or operations of the method 200 described above may include a storing, displaying and/or outputting step as required for a particular application. In other words, any data, records, fields, and/or intermediate results discussed in the methods can be stored, displayed, and/or outputted to another device as required for a particular application. Furthermore, steps, functions, or operations in FIG. 2 that recite a determining operation, or involve a decision, do not necessarily require that both branches of the determining operation be practiced. In other words, one of the branches of the determining operation can be deemed as an optional step.

Figure 3:
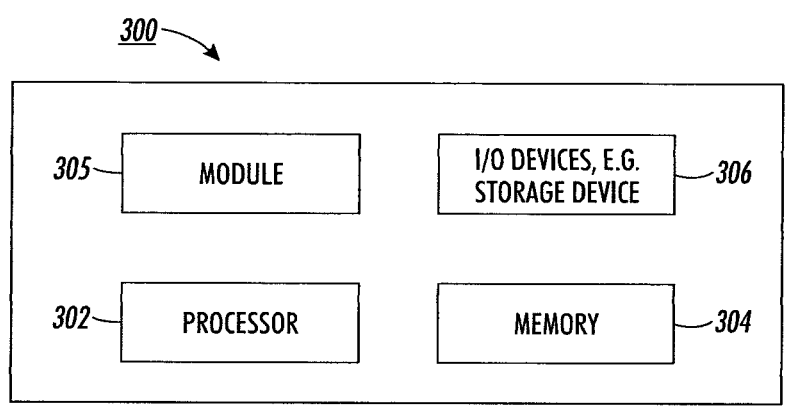
FIG. 3 illustrates a high-level block diagram of a general-purpose computer suitable for use in performing the functions described herein.

FIG. 3 depicts a high-level block diagram of a general-purpose computer suitable for use in performing the functions described herein. As depicted in FIG. 3, the system 300 comprises a processor element 302 (e.g., a SIMD, a CPU, and the like), a memory 304, e.g., random access memory (RAM) and/or read only memory (ROM), a module 305 for providing a healthier food purchase suggestion to a shopper, and various input/output devices 306 (e.g., storage devices, including but not limited to, a tape drive, a floppy drive, a hard disk drive or a compact disk drive, a receiver, a transmitter, a speaker, a display, a speech synthesizer, an output device (such as a graphic display, printer, and the like), an output port, and a user input device (such as a keyboard, a keypad, a mouse, and the like)).

It should be noted that the present disclosure can be implemented in software and/or in a combination of software and hardware, e.g., using application specific integrated circuits (ASIC), a general purpose computer or any other hardware equivalents, e.g., computer readable instructions pertaining to the method(s) discussed above can be used to configure a hardware processor to perform the steps of the above disclosed methods. In one embodiment, the present module or process 305 for providing a healthier food purchase suggestion to a shopper can be loaded into memory 304 and executed by processor 302 to implement the functions as discussed above. As such, the present method 305 for providing a healthier food purchase suggestion to a shopper (including associated data structures) of the present disclosure can be stored on a non-transitory (e.g., physical and tangible) computer readable storage medium, e.g., RAM memory, magnetic or optical drive or diskette and the like. For example, the hardware processor 302 can be programmed or configured with instructions (e.g., computer readable instructions) to perform the steps, functions, or operations of method 200.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for providing a healthier food purchase suggestion to a shopper, comprising:
   generating, by a processor of a mobile scanner, a selection of food items from universal product codes that are scanned by the mobile scanner in a store;
   transmitting, by the processor, the selection of food items to an application server;
   receiving, by the processor, from the application server one or more healthier food items based on at least one substitute food item, a brand preference that is determined from a profile of the shopper obtained from a shopping history of the shopper and a similar purchase made by another shopper within a social network of the shopper, wherein the at least one substitute food item is based on a respective vector of scores calculated by the application server for each one of the selection of food items, wherein calculating the respective vector of scores for the each one of the selection of food items comprises:
      associating a different respective attribute for each score of the respective vector of scores;
      searching an internet for nutritional information associated with the different respective attribute for each score of the respective vector of scores;
      assigning a numerical score between 1-100 based on the nutritional information associated with the different respective attribute for each score of the respective vector of scores; and
      identifying the at least one substitute food item that has a higher overall score component than an overall score component of a respective vector of scores of a corresponding food item of the selection of food items;
   causing, by the processor, the mobile scanner to display the one or more healthier food items in a user interface of the mobile scanner, a location in the store of the one or more healthier food items and a cost of the one or more healthier food items;
   receiving, by the processor, a selection of one of the one or more healthier food items; and
   replacing, by the processor, a corresponding food item in the selection of food items with the selection of the one of the one or more healthier food items.

2. The method of claim 1, wherein the profile of the shopper comprises a dieting goal defined by the shopper.

3. The method of claim 1, wherein the shopping history comprises a plurality of receipts of the shopper saved by a loyalty program subscription of a grocery store.

4. A non-transitory computer-readable medium storing a plurality of instructions which, when executed by a processor of a mobile scanner, cause the processor to perform operations for providing a healthier food purchase suggestion to a shopper, the operations comprising:
   generating a selection of food items from universal product codes that are scanned by the mobile scanner in a store;
   transmitting the selection of food items to an application server;
   receiving from the application server one or more healthier food items based on at least one substitute food item, a brand preference that is determined from a profile of the shopper obtained from a shopping history of the shopper and a similar purchase made by another shopper within a social network of the shopper, wherein the at least one substitute food item is based on a respective vector of scores calculated by the application server for each one of the selection of food items, wherein calculating the respective vector of scores for the each one of the selection of food items comprises:

associating a different respective attribute for each score of the respective vector of scores;

searching an internet for nutritional information associated with the different respective attribute for each score of the respective vector of scores;

assigning a numerical score between 1-100 based on the nutritional information associated with the different respective attribute for each score of the respective vector of scores; and identifying the at least one substitute food item that has a higher overall score component than an overall score component of a respective vector of scores of a corresponding food item of the selection of food items;

causing the mobile scanner to display the one or more healthier food items in a user interface of the mobile scanner, a location in the store of the one or more healthier food items and a cost of the one or more healthier food items;

receiving a selection of one of the one or more healthier food items; and replacing a corresponding food item in the selection of food items with the selection of the one of the one or more healthier food items.

5. The non-transitory computer-readable medium of claim 4, wherein the shopping history comprises a plurality of receipts of the shopper saved by a loyalty program subscription of a grocery store.

6. The non-transitory computer-readable medium of claim 4, wherein the profile of the shopper comprises a dieting goal defined by the shopper.

* * * * *